(12) United States Patent
Bian et al.

(10) Patent No.: US 10,816,728 B1
(45) Date of Patent: Oct. 27, 2020

(54) POLARIZERS WITH CONFINEMENT CLADDING

(71) Applicant: GLOBALFOUNDRIES Inc., Grand Cayman (KY)

(72) Inventors: Yusheng Bian, Ballston Lake, NY (US); Ajey Poovannummoottil Jacob, Watervliet, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/686,782

(22) Filed: Nov. 18, 2019

(51) Int. Cl.
| | |
|---|---|
| *G02B 6/13* | (2006.01) |
| *G02B 6/43* | (2006.01) |
| *G02B 6/126* | (2006.01) |
| *G02B 6/122* | (2006.01) |
| G02B 6/12 | (2006.01) |

(52) U.S. Cl.
CPC .......... *G02B 6/126* (2013.01); *G02B 6/1228* (2013.01); *G02B 6/13* (2013.01); *G02B 2006/12061* (2013.01)

(58) Field of Classification Search
CPC .............. G02F 1/205; G02F 2001/0151; G02F 2202/105; G02B 6/13; G02B 6/126; G02B 6/1228; G02B 2006/12061
USPC .......................................................... 385/11
See application file for complete search history.

(56) References Cited

U.S. PATENT DOCUMENTS

| | | | | |
|---|---|---|---|---|
| 6,442,321 B1* | 8/2002 | Berini | .................... | B82Y 20/00 385/129 |
| 9,470,844 B1 | 10/2016 | Ma et al. | | |
| 10,156,678 B2* | 12/2018 | Novack | .................. | G02B 6/125 |
| 10,645,956 B2* | 5/2020 | Phillips | .................... | A23L 33/12 |
| 10,649,245 B1* | 5/2020 | Bian | ....................... | G02F 1/025 |
| 10,698,159 B2* | 6/2020 | Bian | ....................... | G02B 6/136 |
| 10,707,330 B2* | 7/2020 | Thees | ................. | H01L 29/4908 |
| 2007/0286552 A1* | 12/2007 | Aalto | ..................... | G02B 6/125 385/50 |
| 2008/0212914 A1* | 9/2008 | Marks | .................... | B82Y 20/00 385/2 |
| 2010/0046886 A1* | 2/2010 | Doerr | ..................... | G02B 6/105 385/27 |
| 2017/0003451 A1* | 1/2017 | Ma | ........................... | G02B 6/14 |
| 2018/0081204 A1* | 3/2018 | Ma | ........................... | G02F 1/225 |

(Continued)

OTHER PUBLICATIONS

Sun et al., "Experimental demonstration of a hybrid plasmonic transverse electric pass polarizer for a silicon-on-insulator platform", Optics Letters vol. 37, Issue 23, pp. 4814-4816 (2012).

(Continued)

*Primary Examiner* — Akm E Ullah
(74) *Attorney, Agent, or Firm* — Thompson Hine LLP; Anthony Canale

(57) ABSTRACT

Structures for a polarizer and methods of fabricating a structure for a polarizer. A first waveguide core has a first width, and a polarizer includes a second waveguide core having a second width that is greater than the first width. The second waveguide core is coupled to the first waveguide core. The polarizer includes a layer that is positioned adjacent to a side surface of the second waveguide core. The layer is comprised of a material having a permittivity with an imaginary part that ranges from 0 to about 15.

17 Claims, 4 Drawing Sheets

(56) References Cited

U.S. PATENT DOCUMENTS

2019/0204506 A1\* 7/2019 Becker ................ G02B 6/1221
2020/0112075 A1\* 4/2020 Myers ...................... H01P 3/16

OTHER PUBLICATIONS

Huang et al., "CMOS compatible horizontal nanoplasmonic slot waveguides TE-pass polarizer on insulator platform", Optics Express vol. 21, Issue 10, pp. 12790-12796 (2013).
Dai et al., "Compact broadband polarizer based on shallowly-etched silicon-on-insulator ridge optical waveguides", Optics Express vol. 18, Issue 26, pp. 27404-27415 (2010).
K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.
De Oliveira et al., "Graphene Based Waveguide Polarizers: In-Depth Physical Analysis and Relevant Parameters", Scientific Reports vol. 5, Article No. 16949 (2015).
Bian et al., "Hybrid vanadate waveguiding configurations for extreme optical confinement and efficient polarization management in the near-infrared", Nanoscale, 2018, 10, 16667.
Bian et al., "Polarizers and Polarization Splitters Phase-Matched With a Back-End-Of-Line Layer", filed Mar. 4, 2019 as U.S. Appl. No. 16/291,346.

\* cited by examiner

POLARIZERS WITH CONFINEMENT CLADDING

BACKGROUND

The present invention relates to photonics chips and, more specifically, to structures for a polarizer and methods of fabricating a structure for a polarizer.

Photonics chips are used in many applications and systems including, but not limited to, data communication systems and data computation systems. A photonics chip integrates optical components, such as waveguides, optical switches, and bends, and electronic components, such as field-effect transistors, into a unified platform. Among other factors, layout area, cost, and operational overhead may be reduced by the integration of both types of components.

Polarizers are a type of optical component commonly found in photonics chips. A polarizer is configured to receive an optical signal containing multiple modes (e.g., transverse electric (TE) mode and transverse magnetic (TM) mode) and to allow only one mode to propagate while the other mode is eliminated. Polarizers that pass the TM mode have large footprints that consume significant layout area on the photonics chip.

Improved structures for a polarizer and methods of fabricating a structure for a polarizer are needed.

SUMMARY

In an embodiment of the invention, a structure includes a first waveguide core having a first width and a polarizer including a second waveguide core having a second width that is greater than the first width. The second waveguide core is coupled to the first waveguide core. The polarizer includes a layer that is positioned adjacent to a side surface of the second waveguide core. The layer is comprised of a material having a permittivity with an imaginary part that ranges from 0 to about 15.

In an embodiment of the invention, a method of forming a polarizer is provided. The method includes forming a first waveguide core having a first width, forming a second waveguide core having a second width that is coupled to the first waveguide core, and forming a layer that is positioned adjacent to a side surface of the second waveguide core. The layer is comprised of a material having a permittivity with an imaginary part that ranges from 0 to about 15.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
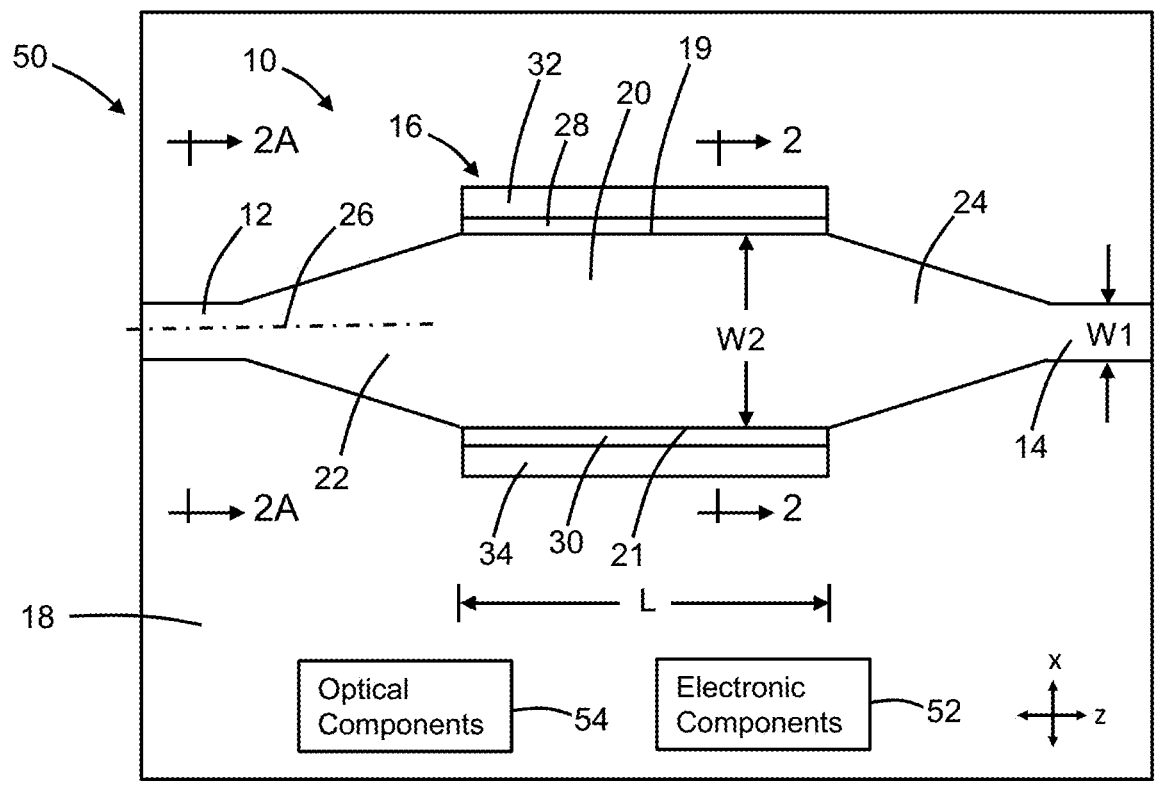
FIG. 1 is a diagrammatic top view of a photonics chip including a structure at an initial fabrication stage of a processing method in accordance with embodiments of the invention.
Figure 2:
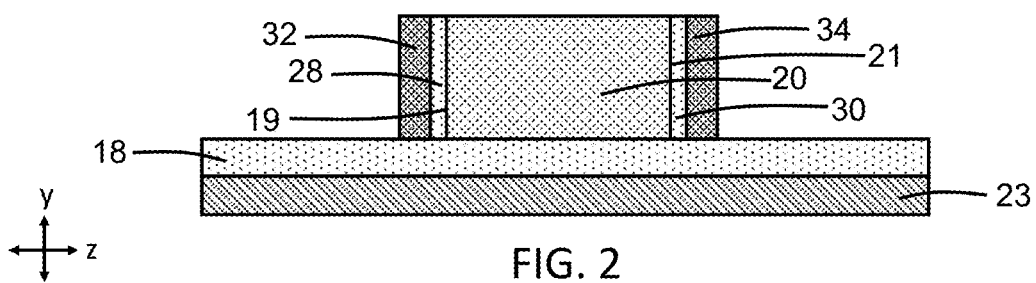
FIG. 2 is a cross-sectional view of the structure taken generally along line 2-2 in FIG. 1.
Figure 2A:
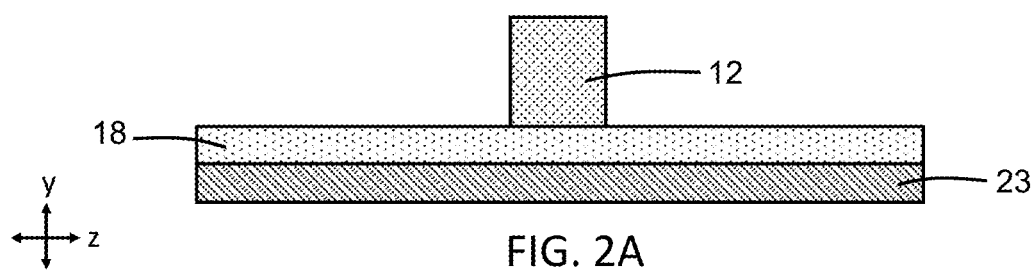
FIG. 2A is a cross-sectional view of the structure taken generally along line 2A-2A in FIG. 1.

With reference to FIGS. 1, 2, 2A and in accordance with embodiments of the invention, a structure 10 includes a waveguide core 12, a waveguide core 14, and a polarizer 16 laterally positioned between the waveguide core 12 and the waveguide core 14. The waveguide cores 12, 14 and polarizer 16 are positioned over a dielectric layer 18. The polarizer 16 includes a waveguide core 20, a taper 22 that couples the waveguide core 20 to the waveguide core 12, and a taper 24 that couples the waveguide core 20 to the waveguide core 14. The waveguide core 12, the waveguide core 20 and tapers 22, 24 of the polarizer 16, and the waveguide core 14 may extend along a longitudinal axis 26. The waveguide core 20 and tapers 22, 24 have opposite side surfaces 19, 21 that merge with the side surfaces of the waveguide cores 12, 14.

The waveguide core 12, the waveguide core 20 and tapers 22, 24 of the polarizer 16, and the waveguide core 14 may be composed of a single-crystal semiconductor material, such as single-crystal silicon from a device layer of a silicon-on-insulator (SOI) wafer. The silicon-on-insulator wafer further includes a buried insulator layer composed of a dielectric material, such as silicon dioxide, that provides the dielectric layer 18 and a substrate 23 composed of a single-crystal semiconductor material, such as single-crystal silicon, under the buried insulator layer. The waveguide core 12, the waveguide core 20 and tapers 22, 24 of the polarizer 16, and the waveguide core 14 may be patterned from the device layer of the silicon-on-insulator wafer by lithography and etching processes during front-end-of-line processing. The device layer may be fully etched to define a rib waveguide as shown or, alternatively, only partially etched to define a ridge waveguide. The waveguide core 12, the waveguide core 20 and tapers 22, 24 of the polarizer 16, and the waveguide core 14, which may be concurrently formed from the same layer of material, may have coplanar or substantially coplanar top and bottom surfaces.

The waveguide core 12 and waveguide core 14 may have a width, W1, and the waveguide core 20 associated with the polarizer 16 may have a width, W2. The taper 22 may provide a transition that flares from the smaller width, W1, of the waveguide core 12 to the larger width, W2, of the waveguide core 20 associated with the polarizer 16. The taper 24 may provide a transition that tapers from the larger width, W2, of the waveguide core 20 associated with the polarizer 16 to the smaller width, W1, of the waveguide core 14. Optical signals propagating with both transverse magnetic (TM) and transverse electric (TE) mode components may be guided on the photonics chip by the waveguide core 12 to the polarizer 16. The TE mode component of the optical signals experiences a high loss in the polarizer 16 and the TM mode component of the optical signals may pass through the polarizer 16 with a low loss to be further guided on the photonics chip by the waveguide core 14.

Layers 28, 30 are formed as a layer pair adjacent to the side surface 19 of the waveguide core 20 of the polarizer 16, and layers 32, 34 are formed as a layer pair adjacent to the opposite side surface 21 of the waveguide core 20 of the polarizer 16. The layer 28 is laterally positioned between the layer 30 and the side surface 19 of the waveguide core 20. The layer 32 is laterally positioned between the layer 34 and the side surface 21 of the waveguide core 20. The layers 28, 32 may terminate at, or approximately at, the interface defined by the intersection between the taper 22 and the waveguide core 20, and the layers 28, 32 may terminate at, or approximately at, the interface defined by the intersection between the taper 24 and the waveguide core 20 such that the layers 28, 32 and the waveguide core 20 have equal or approximately equal lengths, L. The layers 30, 34, the layers 28,32, and the waveguide core 20 may have equal or approximately equal lengths, L. In alternative embodiments, the lengths of the waveguide core 20 and the layers 30, 34 may be unequal. The layers 28, 30 and layers 32, 34 may extend lengthwise parallel to the longitudinal axis 26.

In an alternative embodiment, the layer 28 may be omitted such that the layer 30 is in direct contact with the side surface 19 of the waveguide core 20. In an alternative embodiment, the layer 32 may be omitted such that the layer 34 is in direct contact with the side surface 21 of the waveguide core 20. In an alternative embodiment, the layers 30, 34 may be omitted such that the side surface 21 of the waveguide core 20 is uncovered, and the polarizer 16 may only include the layers 28, 32 that are positioned adjacent to the side surface 19 of the waveguide core 20.

The layer 28 and the layer 32 may be composed of a dielectric material, such as silicon dioxide, that has a lower index of refraction than the material (e.g., single-crystal silicon) of the waveguide core 20. The layers 28, 32 may be formed as sidewall spacers by depositing a conformal layer of their dielectric material over the polarizer 16, patterning the conformal layer with lithography and etching processes to remove the layers 28, 32 from areas other than the vicinity of the polarizer 16, and etching the conformally-deposited and patterned layer with an anisotropic etching process, such as reactive ion etching. The layers 28, 32 are absent from the sidewalls of the waveguide cores 12, 14 and, in the representative embodiment, also absent from the sidewalls 19, 21 of the tapers 22, 24. The layers 28, 32 may have a uniform thickness over their respective lengths in a direction parallel to the longitudinal axis 26. In the representative embodiment, the layer 28 and the layer 32 have equal thicknesses. In an alternative embodiment, the layer 28 and the layer 32 have unequal thicknesses provided by forming each separately. The layers 28, 32 may be formed before the layers 30, 34 are formed. The respective bottom surfaces of the layers 28, 32 are in direct contact with the dielectric layer 18.

The layer 30 and the layer 34 may be each composed of a material with a different composition than the layers 28, 32 and the waveguide core 20. In embodiments, the layers 30, 34 may be composed of a material with a permittivity having a real part in a range of about negative twenty (−20) to about positive twenty (+20), and an imaginary part in a range of zero (0) to about fifteen (15). In an embodiment, the layers 30, 34 may be composed of a material that is not electro-optically active such that the refractive index, which is related to permittivity, does not change with applied bias voltage. In an embodiment, the layers 30, 34 may be composed of a metal vanadate, such as calcium vanadate or strontium vanadate. The layers 30, 34 may function to increase the confinement of the guided optical signals of the TM mode component within the polarizer 16 and thereby reduce loss while reducing the footprint of the polarizer 16. The polarizer 16 is free of noble metals, such as gold or silver, and the fabrication of the polarizer 16 is fully compatible with complementary metal-oxide-semiconductor processes.

The layers 30, 34 may be formed as sidewall spacers by depositing a conformal layer of their material over the polarizer 16, patterning the conformal layer with lithography and etching processes to remove the layers 28, 32 from areas other than the vicinity of the polarizer 16, and etching the conformally-deposited layer with an anisotropic etching process, such as reactive ion etching. The layers 30, 34 are absent from the sidewalls of the waveguide cores 12, 14 and, in the representative embodiment, also absent from the sidewalls 19, 21 of the tapers 22, 24. The layers 30, 34 may have a uniform thickness over their respective lengths in a direction parallel to the longitudinal axis 26. In the representative embodiment, the layer 30 and the layer 34 have equal thicknesses. In an alternative embodiment, the layer 30 and the layer 34 may have unequal thicknesses provided by forming each separately. The layers 30, 34 may be formed after the layers 28, 32 are formed. The respective bottom surfaces of the layers 30, 34 are in direct contact with the dielectric layer 18.

Figure 3:
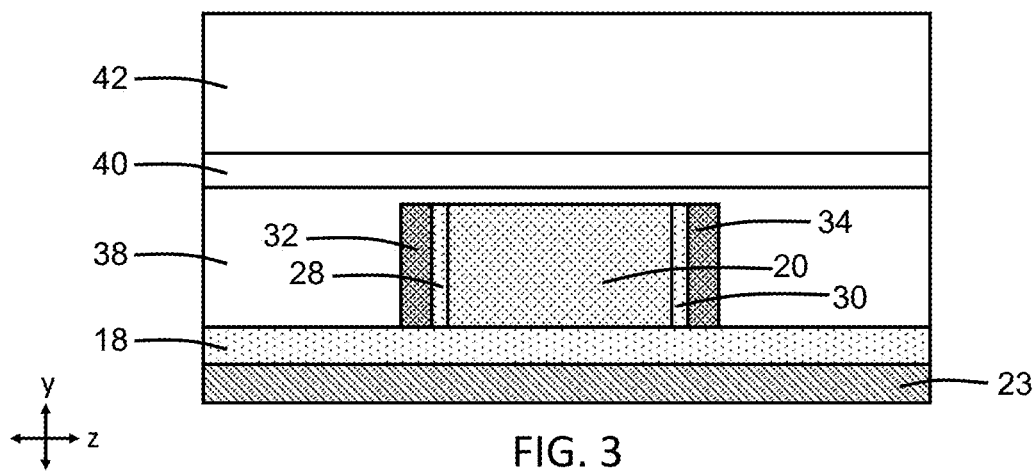
FIGS. 3, 3A are cross-sectional views of the structure at a fabrication stage subsequent to FIGS. 2, 2A.
Figure 3A:
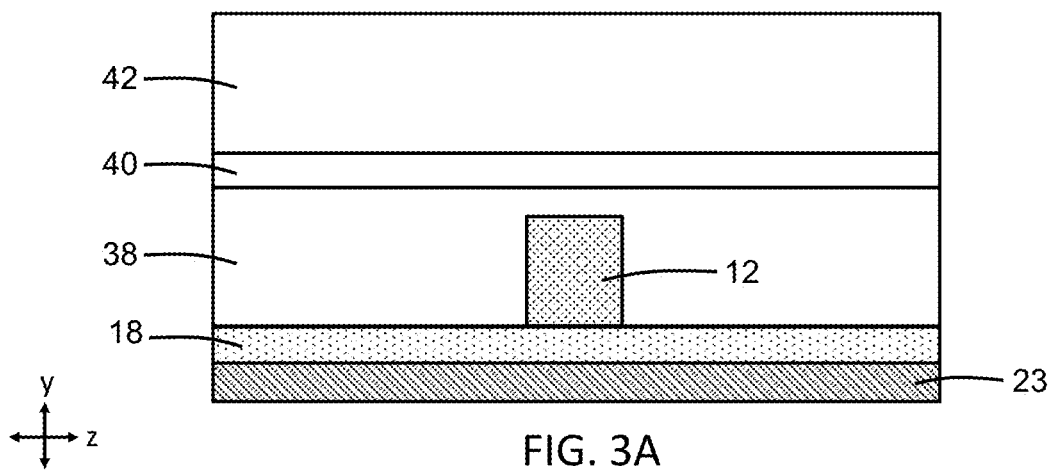

With reference to FIG. 3 in which like reference numerals refer to like features in FIG. 2 and at a subsequent fabrication stage, a dielectric layer 38, a dielectric layer 40, and a back-end-of-line stack 42 are formed over the waveguide cores 12, 14 and polarizer 16. The dielectric layer 38 may be composed of a dielectric material, such as silicon dioxide, deposited by chemical vapor deposition and planarized with, for example, chemical mechanical polishing to remove topography. The waveguide cores 12, 14 and polarizer 16 are embedded or buried in the dielectric material of the dielectric layer 38. The dielectric layer 40, which is optional, may be composed of dielectric material, such as silicon nitride, deposited by chemical vapor deposition or atomic layer deposition over the dielectric layer 38. The back-end-of-line stack 42, which is formed over the dielectric layer 40, may include one or more interlayer dielectric layers composed of one or more dielectric materials, such as a carbon-doped silicon oxide, and metallization composed of, for example, copper, tungsten, and/or cobalt that is arranged in the one or more interlayer dielectric layers. In an embodiment, metallization may be absent over the polarizer 16.

The structure 10, in any of its embodiments described herein, may be integrated into a photonics chip 50 (FIG. 1) that includes electronic components 52 and additional optical components 54. For example, the electronic components 52 may include field-effect transistors that are fabricated by CMOS front-end-of-line (FEOL) processing.

In an alternative embodiment, the waveguide cores 12, 14 and polarizer 16 may be composed of a dielectric material, such as silicon nitride, and may be positioned over the dielectric layer 38. In an alternative embodiment, the waveguide cores 12, 14 may be composed of a dielectric material, such as silicon nitride, the waveguide core 20 and tapers 22, 24 of the polarizer 16 may be composed of a single-crystal semiconductor material, such as single crystal silicon, and respective couplers may be used to transfer the optical signals from the waveguide core 12 to the polarizer 16 and from the polarizer 16 to the waveguide core 14. In an alternative embodiment, the waveguide cores 12, 14 may be composed of a single-crystal semiconductor material, such as single crystal silicon, the waveguide core 20 and tapers 22, 24 of the polarizer 16 may be composed of a dielectric material, such as silicon nitride, and respective couplers may be used to transfer the optical signals from the waveguide core 12 to the polarizer 16 and from the polarizer 16 to the waveguide core 14.

Figure 4:
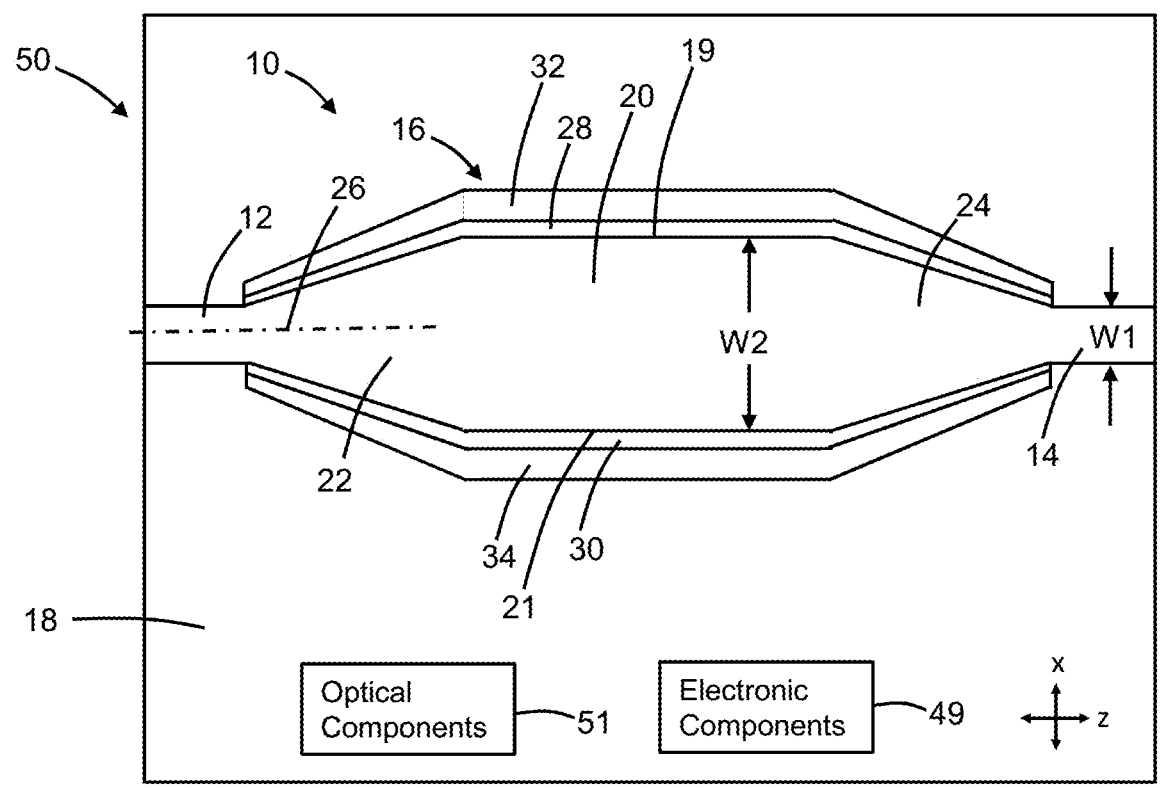
FIG. 4 is a top view of a structure in accordance with alternative embodiments of the invention.

With reference to FIG. 4 in which like reference numerals refer to like features in FIG. 1 and in accordance with alternative embodiments of the invention, the layers 28, 32 and the layers 30, 34 may be extended in length to be located adjacent to the side surfaces 19, 21 of the tapers 20, 22. The layers 28, 32 and layers 30, 34 may terminate at or approximately at the interface defined by the intersection between the taper 22 and the waveguide core 12 and at the interface defined by the intersection between the taper 24 and the waveguide core 14.

In an alternative embodiment, the layer 28 may be omitted such that the layer 30 is in direct contact with the side surface 19 of the waveguide core 20 and tapers 22, 24. In an alternative embodiment, the layer 32 may be omitted such that the layer 34 is in direct contact with the side surface 21 of the waveguide core 20. In an alternative embodiment, the layer 30 and the layer 34 may be omitted such that the side surface 21 of the waveguide core 20 and tapers 22, 24 is uncovered, and the polarizer 16 may only include the layers 28, 32 that are positioned adjacent to the side surface 19 of the waveguide core 20 and tapers 22, 24.

Figure 5:
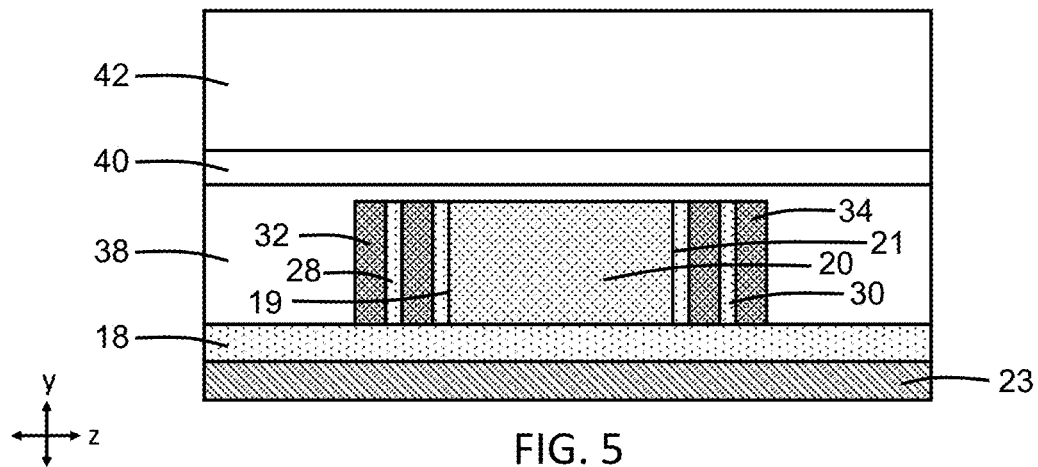
FIGS. 5-6 are cross-sectional views of structures in accordance with alternative embodiments of the invention.

With reference to FIG. 5 in which like reference numerals refer to like features in FIG. 3 and in accordance with alternative embodiments of the invention, one or more additional pairs of the layers 28, 32 may be provided adjacent to the side surface 19 of the waveguide core 20. Optionally, one or more additional pairs of the layers 30, 34 may be provided adjacent to the side surface 21 of the waveguide core 20. In an alternative embodiment, the multiple sets of layers 28, 32 and layers 30, 32 may be extended in length along the side surfaces 19, 21 of the tapers 22, 24, as shown in FIG. 4. In an alternative embodiment, the layers 28, 32 closest to the side surfaces 19, 21 may be omitted to provide direct contact between the side surfaces 19, 21 and the layers 30, 34 closest to the side surfaces 19, 21.

Figure 6:
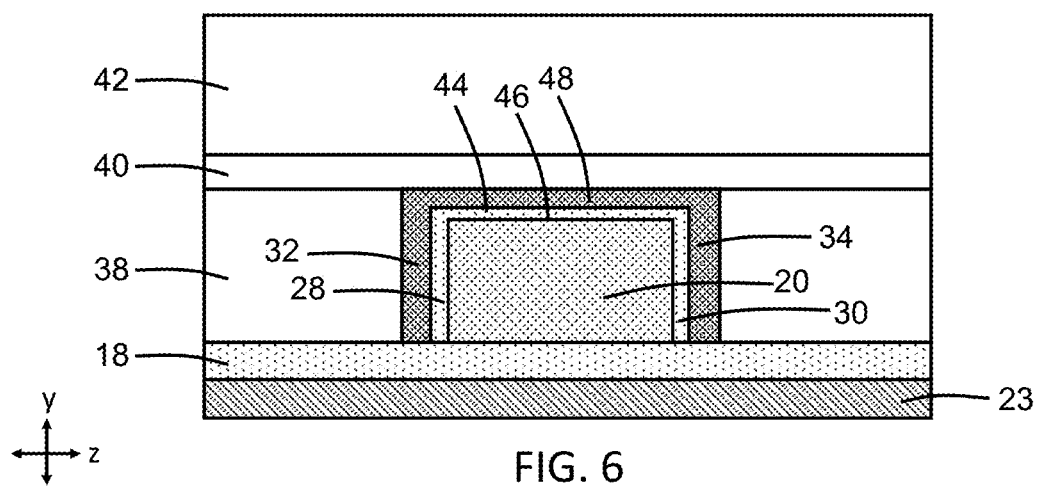

With reference to FIG. 6 in which like reference numerals refer to like features in FIG. 3 and in accordance with alternative embodiments of the invention, an additional layer 44 composed of the same material as the layers 28, 32 may be positioned over a top surface 46 of the waveguide core 20. The additional layer 44 connects the layer 28 with the layer 32 over the top surface 46. The top surface 46 of the waveguide core 20 connects the side surfaces 19, 21 of the waveguide core 20. Similarly, an additional layer 48 composed of the same material as the layers 30, 34 may be positioned over the top surface 44 of the waveguide core 20 with the layer 44 positioned between the layer 48 and the top surface 44. The additional layer 48 connects the layer 30 with the layer 34 over the top surface 46. In an embodiment, the additional layer 48 may be thinner than either of the layers 30, 34. In an alternative embodiment, the additional layer 44 may be omitted such that the layer 48 is in direct contact with the top surface 46 similar to the direct contact between the layers 30, 34 with the side surfaces 29, 21 if the layers 28, 32 are omitted.

In an alternative embodiment, the multiple sets of layers 28, 32, layers 30, 34, and layers 44, 48 may be extended in length along the sidewall surfaces 19, 21 of the tapers 22, 24, as shown in FIG. 4. In an alternative embodiment, addition layers 44, 48 may be provided if multiple sets of layers 28, 32 and layers 30, 34 are provided as shown in FIG. 5.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a first waveguide core having a first width; and
a polarizer including a second waveguide core coupled to the first waveguide core and a first layer, the second waveguide core having a first side surface and a second width that is greater than the first width, the first layer positioned adjacent to the first side surface of the second waveguide core, the first layer comprised of a material having a permittivity with an imaginary part that ranges from 0 to about 15, and the material comprises a metal vanadate.

2. The structure of claim 1 wherein the polarizer includes a second layer positioned between the first layer and the first side surface, and the second layer is comprised of silicon dioxide.

3. The structure of claim 1 wherein the metal vanadate is calcium vanadate or strontium vanadate, and the second waveguide core comprises single-crystal silicon.

4. The structure of claim 1 wherein the metal vanadate is calcium vanadate or strontium vanadate, and the second waveguide core comprises silicon nitride.

5. The structure of claim 1 wherein the polarizer includes a second layer comprised of the material, the second waveguide core has a second side surface, and the second layer is positioned adjacent to the second side surface of the second waveguide core.

6. The structure of claim 5 wherein the polarizer includes a third layer comprised of the material, the second waveguide core has a top surface connecting the first side surface and the second side surface, the third layer is positioned adjacent to the top surface of the second waveguide core, and the third layer connects the first layer with the second layer.

7. The structure of claim 6 wherein the polarizer includes a fourth layer positioned in part between the first layer and the first side surface, in part between the second layer and the second side surface, and in part between the third layer and the top surface, and the fourth layer is comprised of silicon dioxide.

8. The structure of claim 1 wherein the first layer is in direct contact with the first side surface of the second waveguide core.

9. The structure of claim 1 wherein the polarizer includes a second layer and a third layer positioned between the second layer and the first layer, and the third layer is comprised of silicon dioxide, and the second layer is comprised of the material.

10. The structure of claim 9 wherein the first layer is in direct contact with the first side surface of the second waveguide core.

11. The structure of claim 1 wherein the polarizer includes a taper coupling the first waveguide core to the second waveguide core, and the first layer extends adjacent to the taper.

12. The structure of claim 11 wherein the taper and the first waveguide core meet at an interface, and the first layer terminates between the interface and the second waveguide core.

13. The structure of claim 1 wherein the polarizer includes a taper coupling the first waveguide core to the second waveguide core, the taper and the second waveguide core meet at an interface, and the first layer terminates at or before the interface.

14. A method of forming a polarizer, the method comprising:
    forming a first waveguide core having a first width;
    forming a second waveguide core having a second width that is coupled to the first waveguide core; and
    forming a first layer that is positioned adjacent to a side surface of the second waveguide core,
    wherein the first layer is comprised of a material having a permittivity with an imaginary part that ranges from 0 to about 15, and the material comprises a metal vanadate.

15. The method of claim 14 further comprising:
    forming a second layer positioned adjacent to the side surface of the second waveguide core,
    wherein the second layer is arranged between the first layer and the side surface, and the second layer comprises silicon dioxide.

16. The method of claim 14 wherein the metal vanadate is calcium vanadate or strontium vanadate, and the second waveguide core comprises single-crystal silicon.

17. The method of claim 14 wherein the metal vanadate is calcium vanadate or strontium vanadate, and the second waveguide core comprises silicon nitride.

* * * * *